(12) United States Patent
Örling

(10) Patent No.: US 6,430,587 B1
(45) Date of Patent: Aug. 6, 2002

(54) METHOD AND APPARATUS FOR FFT COMPUTATION

(75) Inventor: Anders Örling, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/353,876

(22) Filed: Jul. 15, 1999

Related U.S. Application Data

(63) Continuation of application No. PCT/SE98/00055, filed on Jan. 15, 1998.

(30) Foreign Application Priority Data

Jan. 15, 1997 (SE) .............................................. 9700099

(51) Int. Cl.$^7$ .......................... G06F 15/00; G06F 17/14
(52) U.S. Cl. .................................... 708/404; 708/400
(58) Field of Search ................................ 708/404, 400, 708/401

(56) References Cited

U.S. PATENT DOCUMENTS

| | | | |
|---|---|---|---|
| 3,731,284 A | * 5/1973 | Thies | ........................ 708/404 |
| 4,821,224 A | 4/1989 | Liu et al. | |
| 4,977,533 A | 12/1990 | Miyabayashi et al. | |
| 5,268,853 A | * 12/1993 | Tanaka et al. | ............... 708/401 |
| 5,297,070 A | * 3/1994 | Hua et al. | ................... 708/404 |
| 5,365,470 A | 11/1994 | Smith | |
| 5,473,556 A | 12/1995 | Aguilar et al. | |
| 6,081,821 A | * 6/2000 | Hopkinson | ................... 708/404 |

OTHER PUBLICATIONS

Choinski, et al., "Generation of Digit Reversed Address Sequences for Fast Fourier Transforms", IEEE Transactions on Computers, vol. 40, No. 6, Jun. 1991.
Walker, J., "A New Bit Reversal Algorithm", IEEE Transactions on Acoustics, Speech, and Signal Processing, vol. 38, No. 8, Aug. 1990.
Rodriguez, J., "An Improved FFT Digit–Reversal Algorithm", IEEE Transactions on Acoustics, Speech, and Signal Processing, vol. 37, No. 8, Aug. 1989.

* cited by examiner

Primary Examiner—Tan V. Mai
(74) Attorney, Agent, or Firm—Burns, Doane, Swecker & Mathis, L.L.P.

(57) ABSTRACT

A method and an apparatus for computing Fast Fourier Transforms (FFT) on a serial input of data blocks are described. Two input buffers share one data processing device in such a way that, at any given time, one buffer is receiving input data while the data in the other buffer is being processed. The need for bit reversal of the data block in the input buffer is eliminated, thus removing one time consuming step in the FFT. This is achieved by writing blocks of input data to the buffer alternately in natural order and in bit reversed order. When the output data in the buffer is in the reverse order, the buffer is addressed in the same reverse order so that the data points are sent in the correct order to the output. At the same time, the new input data is written to the buffer in the reverse order.

12 Claims, 3 Drawing Sheets

METHOD AND APPARATUS FOR FFT COMPUTATION

This is a continuation of International application Ser. No. PCT/SE98/00055 filed Jan. 15, 1998.

BACKGROUND

The present invention relates to the area of Fast Fourier Transforms (FFT) and in particular to methods for performing FFT on a serial input of blocks of data.

In digital telecommunications new applications for FFT have arisen. The principle of using FFT to modulate data onto multiple orthogonal carrier frequencies is becoming widely spread in different types of communication systems such as wideband cellular mobile radio systems and terrestrial digital video broadcasting.

In all these types of products the main part of the computation carried out is FFT computation. In the new applications mentioned above, in contrast to most of the earlier FFT applications, the input data is not all available at the same time; instead a more or less constant flow of data is received. Thus input buffers are used to store the incoming data. When an input buffer is full, the data is computed in a processing device and written to the same buffer, which is then used as an output buffer or to another output buffer.

One problem with such computations is that the data is written out from the data processor in a different order from how it is read in, depending on the radix used. If radix-2 is used, the order will be bit reversed, i.e. the points will appear in the order given by reversing the binary representation of each point's index. With other radices, groups of bits in the binary representation are reordered instead, while the internal bit order in each group is maintained. This is called digit reversal.

Normally the data points are delivered to the FFT device serially in natural order as they are available. When a complete block of input data has been received, FFT computation is performed on the data block, and the output data is written to the same buffer or to another buffer. The device receiving the computed FFT data expects the output data to be sent serially, in natural order and with the same rate.

As the FFT algorithm changes the order of the data, this means that the output points must be reordered before they are sent to the output. Assuming a buffer size of N points, this means that N read and N write operations must be performed in the buffer before the data can be sent to the output.

A known apparatus for FFT computation uses two buffers, each of which is adapted to alternately connecting to 1) an input source and an output and 2) an FFT computation device. When one buffer is-receiving input data and transmitting output data, the FFT computation device is processing the data in the other buffer. The buffers are then swapped, so that the newly received input data is processed, while the new output data is transmitted from, and new input data is received from, the other buffer.

Before the output data is written from a buffer to the output, and new input data can be read to that buffer, the order of the data points must be changed. This procedure prolongs the computation process significantly.

Another known solution is to use separate output buffers to which the processed data is written from the data processing means. In this way, new input data can be written to the output buffer without the risk of overwriting output data However, extra hardware is required. Also, the actual time of the computations is not reduced.

SUMMARY

Thus it is an object of the invention to provide a method and an apparatus for FFT computation of a constant flow of data.

It is another object of the invention to provide a method and an apparatus for FFT computation of a constant flow of data in which data is received and passed on in natural order with a minimum need for additional hardware.

It is also an object of the invention to provide a method and an apparatus which reduce the time needed for FFT computation by eliminating the need for bit reversal in connection with the FFT computation.

According to the invention, these objects are achieved by eliminating the need for bit reversal in the buffer. This may be done in several ways, as disclosed in the independent claims.

A preferred embodiment of the invention uses the fact that an FFT algorithm can be arranged in two ways: 1) the input data is written to the buffers in a natural order and the transformed data is written to the buffer in a bit reversed or digit reversed order, or 2) the data is written to the buffer in a bit reversed or digit reversed, order and the transformed data is written to the buffer in a natural order.

In the preferred embodiment, input data is written to the buffer alternately in natural order and in bit reversed or digit reversed order. Thus, when the bit reversed or digit reversed output data is read from the buffer, the buffer can be addressed in such a way that the points appear in the natural order. In this case, writing new input data to the buffer in natural order would cause some output data to be overwritten before it was sent to the output. Instead the new input data is written to the buffer in the bit reversed order, which is the sane order that is used for reading the output data from the buffer. When the input data that arrived in a bit reversed order has been processed it will appear in the buffer in the natural order. This time the output data will be read in the natural order and hence, the input data can be written to the buffer in the natural order. Consequently, this time the processed output data will appear in the bit reversed order, and so on.

This involves rearranging the FFT algorithm when operating on input data that is in a bit reversed order. This can be done with minimum effect on the FFT device, provided an algorithm with the same radix in all columns is used. The rearrangement consists of simply reversing the order in which the butterfly columns are executed while still using the same twiddle factors. This arrangement causes the output data to appear in the output buffer in natural order. An FFT device that is adapted for one of the structures is also well suited for the other structure. How to use the reverse algorithm is well known to the person skilled in the art.

When data is received in the buffer in natural order, the transformed data appears in the buffer in bit reversed or digit reversed order. To avoid having to change the order of the data in the buffer before reading it to the output, the buffer is addressed in a bit reversed or digit reversed order. This gives rise to one problem: reading the new data to the buffer in the same order as before, would cause the old data to be over-written before it could be outputted. Therefore, according to the invention, the new data is written to the buffer in reverse order.

The invention offers the following advantages:

A constant flow of data can be received in natural order, processed according to an FFT algorithm and transmitted in natural order.

The execution time for one FFT is reduced with N read cycles and N write cycles to the memory buffers at a negligible hardware cost and increased complexity.

Thus, the FFT device can perform the same number of computations per time unit at reduced power consumption, or the rate at which FFTs are being computed may be increased.

BRIEF DESCRIPTION OF THE DRAWINGS

The invention will be further disclosed in the following, with particular reference to the drawings, in which.

DETAILED DESCRIPTION

Figure 1:
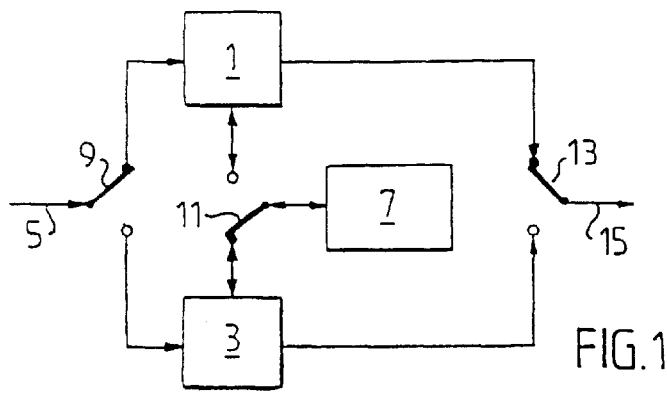
FIG. 1 shows a known buffer arrangement for FFT computation.

FIG. 1 shows a buffer arrangement for FFT computation which is known per se but used as a component of the invention. A first 1 and a second 3 buffer are used, which may alternately receive data from an input source 5. A data processing means 7, connected alternately to the first and the second buffer, performs the FFT computations on the data in the buffer to which it is connected at any given time.

A selecting means 9 selects the buffer to which input data is to be read. Another selecting means 11 selects the buffer which is to be connected to the processing means 7. A third selecting means 13 selects the buffer from which data is to be written to the output. The selecting means are coordinated so that the buffer currently receiving input data also outputs data to an output 15 while the buffer not currently receiving and transmitting data is connected to the processing means 7.

In FIG. 1, input data is being written to, and output data is being read from the first buffer 1 while FFT computations are performed on data in the second buffer 3. When the first buffer 1 has been filled with new input data, the computation of the data in second buffer 3 must be ready so that their functions may be changed. In the next stage, data in the first buffer 1 will be processed while input data will be written ten to, and output data from, the second buffer 3. When the second buffer 3 is filled with input data, the processing of the data in the first buffer 1 must be ready, and the functions are changed again.

Because of the properties of the FFT algorithm, output data, that is, data that has been processed by the data processing means, appears in the buffer in a bit reversed or digit reversed order. Therefore, bit reversal or digit reversal must be carried out at the end of each computation cycle, so that the output data may be transmitted from the buffer in natural order while new input data is being written to the buffer.

In the following, various embodiments of the invention will be described each of which eliminates the need for bit reversal or digit reversal of the output data while it is in an input buffer.

Figure 2:
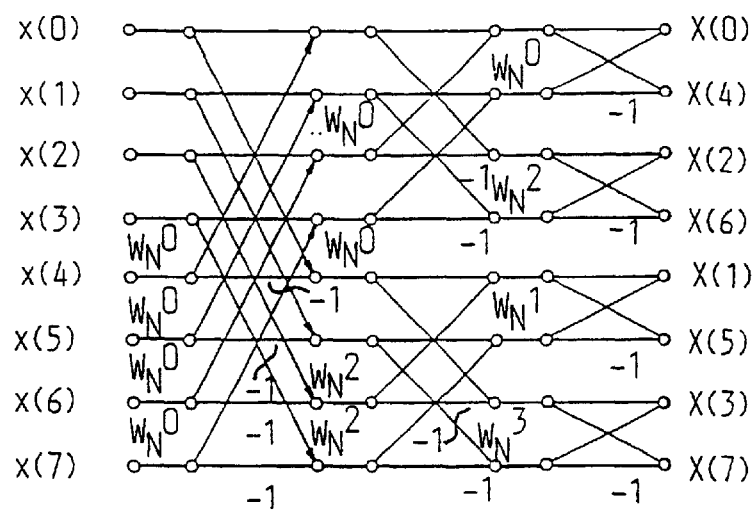
FIG. 2 shows an algorithm structure for receiving input data in natural order and outputting data in a bit reversed order.

FIG. 2 shows an example of an algorithm structure for receiving input data in natural order. Because of the properties of the FFT algorithm, the output data will then appear in a bit reversed order. In this example radix-2 and decimation in time are used. Each block of data contains eight points, numbered x(0) to x(7). Input data points are represented by lower case x followed by the order number in parenthesis. Output data points are represented by upper case X followed by the order number in parenthesis.

The algorithm results in bit reversed order of the data points. In this example, with eight data points used, the binary representation of each data point requires three bits, for example, 001 represents point number 1. Bit reversed this becomes 100, which equals 4 in the decimal system.

TABLE 1 bit reversal of binary numbers with three bits

| order number (decimal) | order number (binary) | bit reversed (binary) | bit reversed (decimal) |
|---|---|---|---|
| 0 | 000 | 000 | 0 |
| 1 | 001 | 100 | 4 |
| 2 | 010 | 010 | 2 |
| 3 | 011 | 110 | 6 |
| 4 | 100 | 001 | 1 |
| 5 | 101 | 101 | 5 |
| 6 | 110 | 011 | 3 |
| 7 | 111 | 111 | 7 |

As can be seen in the left part of FIG. 2, reading from top to bottom the input data is in natural order, that is, x(0), x(1), x(2), etc. The transformed data to the right in the figure is in the bit reversed order X(0), X(4), X(2), etc. as shown in table 1. This is the order in which the data appears in the buffer after the FFT computation has been performed.

Figure 3:
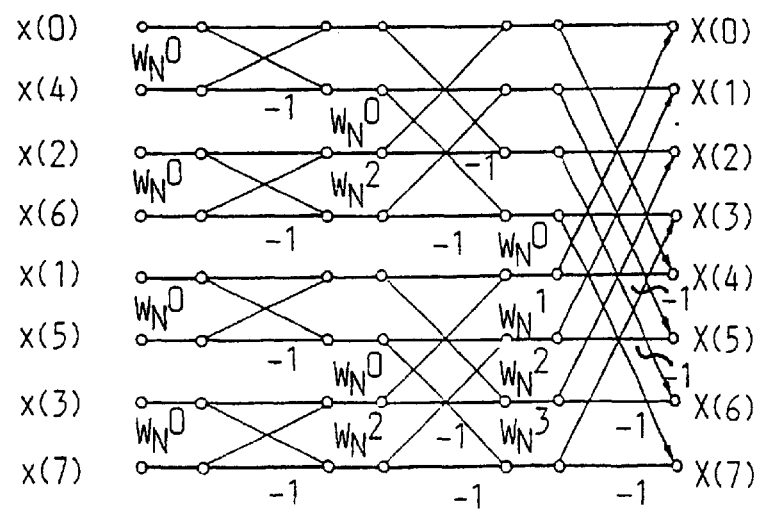
FIG. 3 shows an algorithm structure for receiving input data in bit reversed order and outputting data in natural order.
Figure 4:
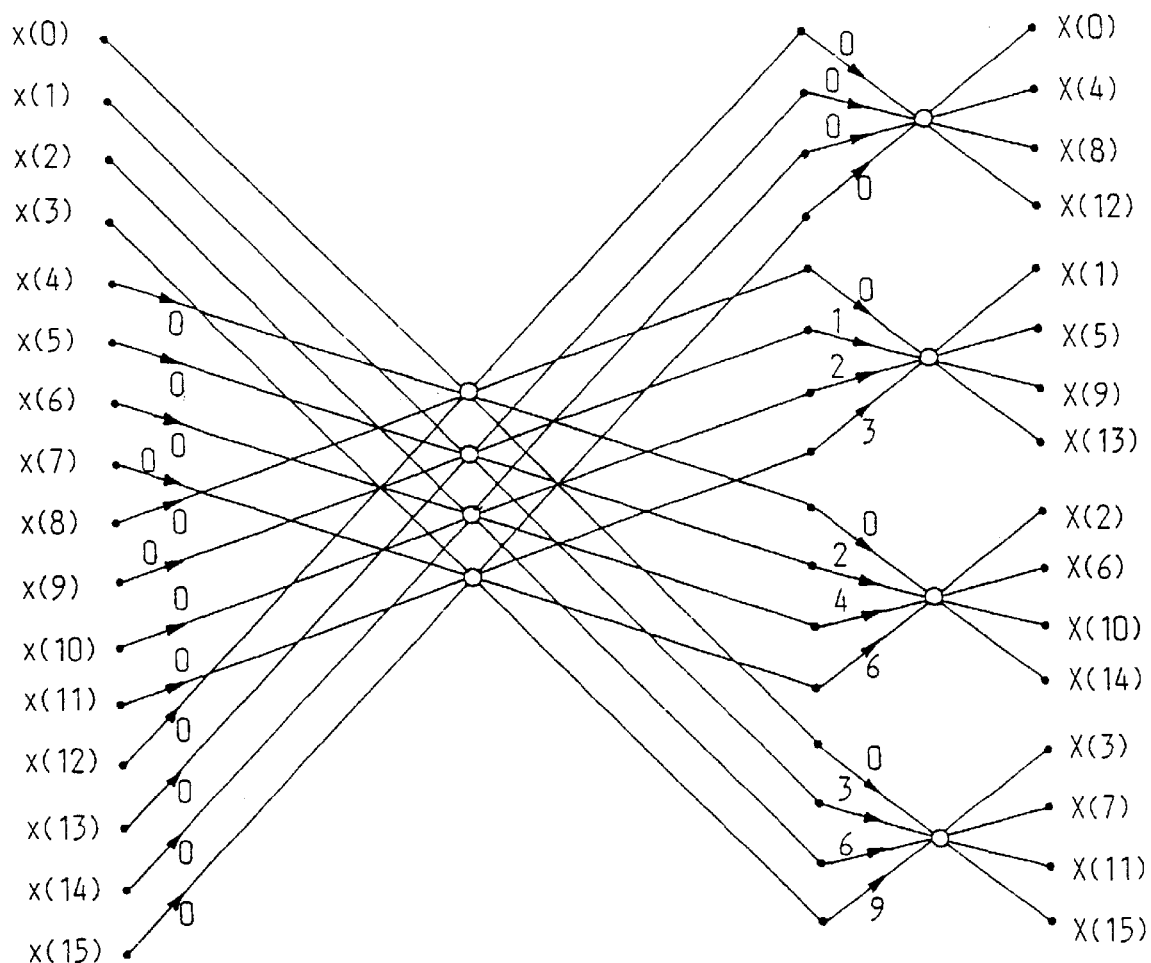
FIG. 4 shows an algorithm structure for receiving input data in natural order and outputting data in a digit reversed order.

FIG. 3 shows the reverse algorithm structure of the one shown in FIG. 2. In this figure, input data is received in bit reversed order, that is, x(0), x(4), x(2), etc. and output data is transmitted in natural order, that is, X(0), X(1), X(2), etc. FIG. 4 shows an example of another algorithm using radix-4 and decimation in time. The number of data points is 16, which means that four bits are needed for binary representation of the numbers. This algorithm results in a digit reversed order of output data, that is, the first two digits change places with the last two digits in the binary number, so that a decimal 9 (10 01) becomes 01 10 or 6. The order of the points before and after digit reversal is shown in table 2. If input data points in digit reversed order is used, the output data points will appear in natural order.

TABLE 2 digit reversal of binary numbers with four bits

| order number (decimal) | order number (binary) | digit reversed (binary) | digit reversed (decimal) |
|---|---|---|---|
| 0 | 0000 | 0000 | 0 |
| 1 | 0001 | 0100 | 4 |
| 2 | 0010 | 1000 | 8 |
| 3 | 0011 | 1100 | 12 |
| 4 | 0100 | 0001 | 1 |

TABLE 2-continued digit reversal of binary numbers with four bits

| order number (decimal) | order number (binary) | digit reversed (binary) | digit reversed (decimal) |
|---|---|---|---|
| 5 | 0101 | 0101 | 5 |
| 6 | 0110 | 1001 | 9 |
| 7 | 0111 | 1101 | 13 |
| 8 | 1000 | 0010 | 2 |
| 9 | 1001 | 0110 | 6 |
| 10 | 1010 | 1010 | 10 |
| 11 | 1011 | 1110 | 14 |
| 12 | 1100 | 0011 | 3 |
| 13 | 1101 | 0111 | 7 |
| 14 | 1110 | 1011 | 11 |
| 15 | 1111 | 1111 | 15 |

FIG. shows an arrangement for FFT computation according to a first preferred embodiment of the invention. A similar arrangement to the one shown in FIG. 1 is used, comprising two buffers 21, 23, one of which contains data currently being processed by a processing means 25 and one currently receiving input data and transmitting output data.

Figure 5:
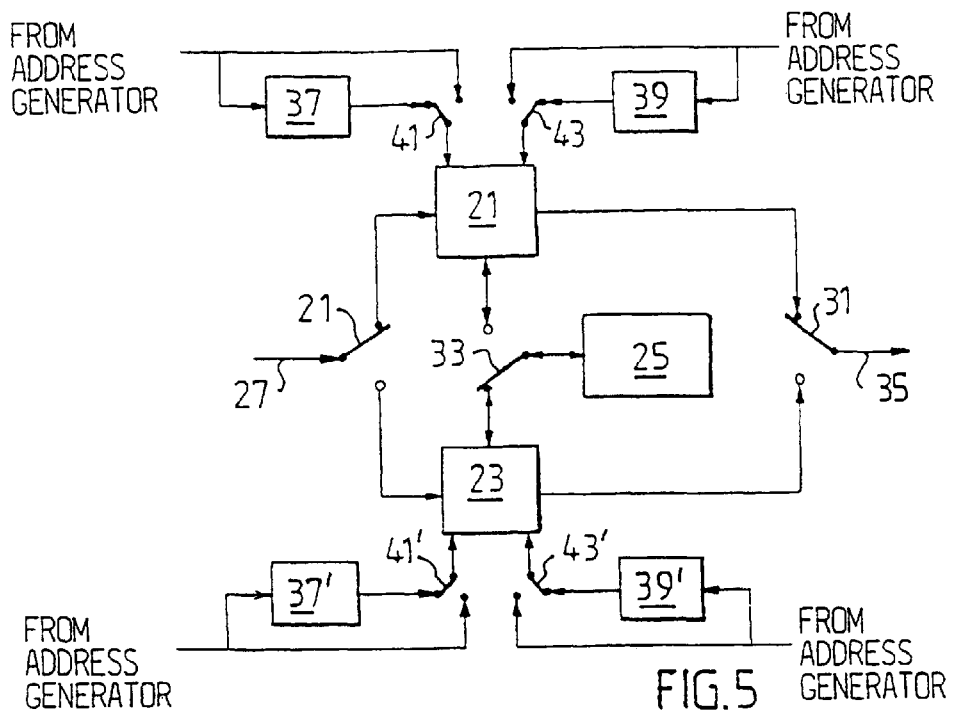
FIG. 5 shows the apparatus according to a first embodiment of the invention.

There is an input source 27 which may alternately feed input data to the two buffers 21 and 23 and an output 35 which alternately takes output from the two buffers 21 and 23. A first 29 and a second 31 selector select the buffer to which input data is to be written and from which output data is to be read. A selector 33 selects the buffer to which the processing means 25 is to be connected. The selectors are co-ordinated so that, at a given time, one buffer is both receiving and transmitting data, while the data in the other buffer is being processed in the processing means 25. In FIG. 5. the first buffer 21 is the one currently receiving and transmitting data, while the data in the second buffer 23 is being processed.

Every other block of data that is written to one of the buffers 21, 23 is placed in the buffer in natural order. The output produced from these blocks by the processing means 25 appears in bit reversed or digit reversed order in the buffer. Therefore, the buffer is addressed in a bit reversed or digit reversed way, and the next block written to this buffer is written in bit reversed order. When the input data is sent to the FFT in bit reversed order, the output from the same FFT is placed in natural order and the next block of input data is written to the buffer is written in natural order.

To each buffer 21, 23 two bit reversing blocks are connected: one input bit reversing 37, 37' on the input for when the input data is to be in bit reversed order, and one output bit reversing 39, 39' for when the output data is in bit reversed order. Of course the bit reversing blocks 37, 37', 39, 39' should be adapted to perform the bit reversal or digit reversal applicable to the FFT algorithm used. Selecting means 41, 41' and 43, 43' connect or disconnect the input bit reversing 37, 37' and the output bit reversing 39, 39' respectively.

Address generator signals are applied to the buffer 21, 23 currently receiving data from the input 27 and transmitting data to the output 35, to determine the order in which data should be written to, and read from the buffer. When data is written to, and read from, the buffer in natural order, the address generator signals are applied directly to the buffer. When data is written to, and read from, the buffer in bit reversed or digit reversed order, the address generator signals pass through the bit reversing means, which reverses the address generator signal in the same way as data is reversed when processed in the data processing device 25. The buffer is then addressed in the bit reversed or digit reversed order.

At any given time, the bit reversing blocks only serve the buffer currently receiving and transmitting data. Thus, the input bit reversing blocks 37, 37' could be implemented as one bit reversing block, which would then be shared between the two buffers 21 and 23.

Figure 6:
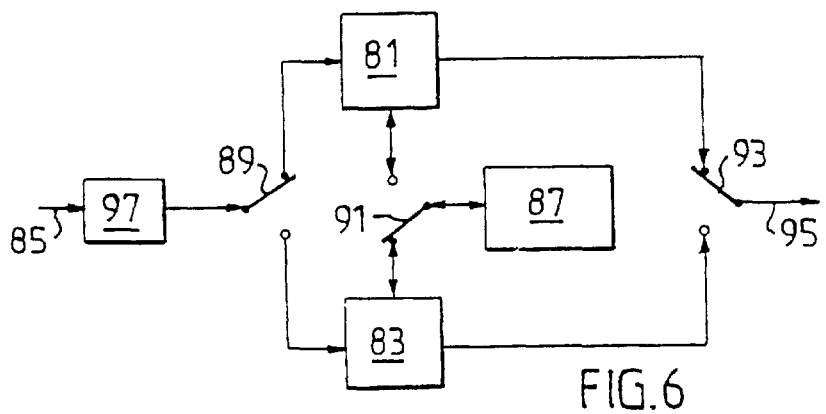
FIG. 6 shows the apparatus according to a second embodiment of the invention.

A second embodiment of the invention is shown in FIG. 6. A first 81 and a second 83 buffer are used, which may alternately receive data from an input source 85. There is a data processing means 87, to which both buffers may connect which performs the FFT computations on the data in this buffer.

A selecting means 89 selects the buffer to which input data is to be read. Another selecting means 91 selects the buffer which is to be connected to the processing means 87. A third selecting means 93 selects the buffer from which data is to be written to the output 95. The selecting means are co-ordinated so that the buffer currently receiving input data also outputs data to an output 95 while the buffer not currently receiving and transmitting data is connected to the processing means 87.

On the input, there is a bit reversing means 97 which reverses the order of the incoming data before it is written to the buffer. In this way, the output data appears in the natural order, and no bit reversal on the output is required.

Figure 7:
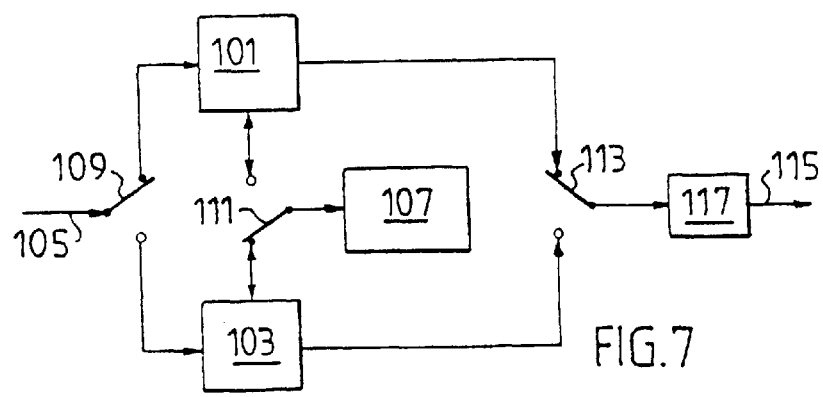
FIG. 7 shows the apparatus according to a third embodiment of the invention.

A third embodiment of the invention is shown in FIG. 7. A first 101 and a second 103 buffer are used, which may alternately receive data from an input source 105. There is a data processing means 107, to which both buffers may connect, which performs the FFT computations on the data in this buffer.

A selecting means 109 selects the buffer to which input data is to be read. Another selecting means 111 selects the buffer which is to be connected to the processing means 107. A third selecting means 113 selects the buffer from which data is to be written to the output 115. The selecting means are coordinated so that the buffer currently receiving input data also outputs data to an output 115 while the buffer not currently receiving and transmitting data is connected to the processing means 107.

In this embodiment, output data is read from the buffer in the order in which it appears. On the output, there is a bit reversing means 117 which reverses the order of the outgoing data after it has been read from the buffer. In this way, the input data may be sent to the buffer in the natural order, and the bit reversal will be performed on the output data.

In FIGS. 2 and 3 the FFT algorithm used is a radix-2 decimation-in-time algorithm. In FIG. 4 a radix-4 decimation in time algorithm is shown. However, it will be obvious to the person skilled in the art how to apply the teachings of the invention to any FFT algorithm using only one type of radix butterflies.

What is claimed is:

1. A method of computing fast Fourier transforms (FFT) of a series of data blocks using at least first and second buffers to receive and temporarily store data blocks and at least one data processor to perform an FFT, during which an order of data in a data block is bit or digit reversed, comprising:

writing input data to and reading output data from the first buffer while the data in the second buffer is being processed by the data processor;

writing input data to and reading output data from the second buffer while the data in the first buffer is being processed by the data processor; and providing output data in serial form and in the same order and at the same rate as the input data is written to the first and second buffers;

wherein for each data block, bit or digit reversal is provided either on the input data block or on the output data block by reversing either the order in which the input data is written into the buffer or the buffer from which the data is output.

2. The method of claim 1, wherein reversal is performed while the input data is being written into a buffer and the data processor processes the data according to the bit reversed or digit reversed FFT algorithm.

3. The method of claim 2, wherein reversal is carried out by addressing a buffer in a bit or digit reversed way either when writing data to the buffer or when reading data from the buffer.

4. The method of claim 2, wherein reversal is carried out in a bit reverser connected to at least one of the input and the output of a buffer.

5. The method of claim 1, wherein reversal is performed while the output data is being read from a buffer.

6. The method of claim 1, wherein every other data block is bit or digit reversed before it is processed when being written into a buffer and every other data block is bit or digit reversed when being read from the buffer after processing, and the processor is adapted to perform the FFT alternately in a natural order and according to the bit reversed or digit reversed algorithm.

7. An apparatus for computing fast Fourier transforms (FFT) of a series of input data blocks, during which an order of data in the data blocks is bit or digit reversed, comprising:

at least a first buffer and a second buffer to receive and temporarily store data blocks;

at least a data processor to perform the FFT;

a first controller to control which one of the first and second buffers is to receive input data and transmit output data at any given time and which other of the first and second buffers is to be connected to the data processor at the same given time; and at least one order controller to provide bit or digit reversal either on an input data block or on an output data block by reversing either the order of the input data or the order of the output data;

wherein output data is provided in serial form and in the same order and at the same rate as the input data is received into the first and second buffers.

8. The apparatus of claim 7, wherein the order controller comprises a bit or digit reverser adapted for connection to a buffer input.

9. The apparatus of claim 7, wherein the order controller comprises a bit or digit reverser adapted for connection to a buffer output.

10. The apparatus of claim 7, wherein the processor is adapted to perform FFT computations alternately in natural order and according to a bit or digit reversed algorithm, and each buffer receives input data alternately in natural order and in bit or digit reversed order.

11. The apparatus of claim 7, wherein the order controller changes the order in which a buffer is addressed when data is being written to and/or read from the buffer.

12. The apparatus of claim 7, wherein the order controller changes the order of the data before it has been written to a buffer and/or after the data has been read from the buffer.

* * * * *